US012737478B2

(12) United States Patent
Szimmetat

(10) Patent No.: US 12,737,478 B2
(45) Date of Patent: Sep. 15, 2026

(54) AUTOMATED CYBER SECURITY AND REGULATORY RISK MANAGEMENT SYSTEM USING NATURAL LANGUAGE PROCESSING

(71) Applicant: Oliver Szimmetat, Redmon, WA (US)

(72) Inventor: Oliver Szimmetat, Redmon, WA (US)

( * ) Notice: Subject to any disclaimer, the term of this patent is extended or adjusted under 35 U.S.C. 154(b) by 106 days.

(21) Appl. No.: 18/768,564

(22) Filed: Jul. 10, 2024

(65) Prior Publication Data

US 2026/0017379 A1 Jan. 15, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 21/577; G06F 2221/034
See application file for complete search history.

(56) References Cited

U.S. PATENT DOCUMENTS 10,643,227 B1 * 5/2020 Gupta ................ G06Q 30/0204
2013/0110866 A1 * 5/2013 Furtado .................. H04L 51/52 707/769
2021/0342737 A1 * 11/2021 Gupta .................... G06N 20/00
2022/0215332 A1 * 7/2022 Kwok .................. G06Q 10/087
2024/0256701 A1 * 8/2024 Szimmetat ............ G06F 21/577
2024/0411988 A1 * 12/2024 Ritchie ................. G06F 40/226
2025/0156460 A1 * 5/2025 Gibson ................... G06F 16/35
2025/0211419 A1 * 6/2025 Chen ......................... H04L 9/06
2025/0260707 A1 * 8/2025 Belgi .................. H04L 63/1433
2025/0328653 A1 * 10/2025 Chen ..................... G06F 21/552
2025/0335601 A1 * 10/2025 Fujita .................... G06F 21/577
2025/0363836 A1 * 11/2025 Khamis ................ G07C 5/0816

* cited by examiner

*Primary Examiner* — Oleg Survillo
(74) *Attorney, Agent, or Firm* — Alloy Patent Law; Walker Griffin Weitzel

(57) ABSTRACT

This invention provides an automated system for managing cyber security and regulatory risks. It retrieves internal documents from platforms like Google Drive and OneDrive, and external documents from trusted sources via RSS feeds. Documents are stored in centralized locations with lifecycle management, enriched with contextual labels, and used to augment and fine-tune a language model. Real-time threat intelligence and news feeds are integrated, enabling the system to analyze security advisories and regulatory requirements, generating actionable insights and recommendations. The system integrates with workflow management tools like Jira for tracking work items and provides a natural language interface for ad-hoc user interaction. This comprehensive solution enhances operational efficiency, reduces manual efforts, and ensures timely responses to emerging threats and regulatory changes.

20 Claims, 3 Drawing Sheets

AUTOMATED CYBER SECURITY AND REGULATORY RISK MANAGEMENT SYSTEM USING NATURAL LANGUAGE PROCESSING

FIELD OF THE INVENTION

The present invention pertains to the domain of cyber security, offering a comprehensive solution to assist organizations in managing and mitigating security and regulatory risks. This system automates the retrieval, analysis, and application of both internal and external information, providing actionable insights and recommendations in a secure manner. The core of the invention lies in its use of natural language processing (NLP) to interpret requirements and adapt to changes in the threat landscape.

BACKGROUND

In the rapidly evolving landscape of cyber security, organizations face a multitude of challenges in safeguarding their information assets and ensuring compliance with regulatory requirements. Traditional approaches to managing these risks often involve manual processes, which are time-consuming, prone to errors, and unable to keep pace with the dynamic nature of threats and regulations.

One of the significant issues is the sheer volume and complexity of security advisories that organizations receive from various sources, including software vendors, government agencies, and independent security researchers. These advisories can be highly technical and complex, making it difficult for security teams to quickly understand and act upon them. Manually reviewing and assessing the relevance of each advisory to the organization's specific environment is labor-intensive and often results in delays in mitigating potential threats. Regulatory compliance is another critical challenge. Regulatory requirements in the cyber security domain are becoming increasingly stringent and diverse. Organizations must comply with a myriad of regulations, such as GDPR, HIPAA, PCI-DSS, ISO 27001, and SOC2, each with its own set of requirements. Ensuring compliance requires continuous monitoring and updating of policies and controls, which is a resource-intensive process. Failure to comply can result in significant financial penalties and reputational damage. Vendor assessment and management also pose considerable difficulties. Organizations frequently need to assess the security posture of their vendors, especially in the context of third-party risk management. This typically involves responding to detailed security questionnaires, which is a repetitive and time-consuming task that diverts valuable resources from more critical security activities. The dynamic threat landscape adds another layer of complexity. The threat landscape is continuously evolving, with new vulnerabilities and attack vectors emerging regularly. Staying up to date with the latest threats and understanding their implications for the organization is crucial. Traditional methods of threat intelligence gathering, and analysis are often reactive and insufficiently agile, leading to a lag in response times.

Effective risk management requires a thorough understanding of the organization's internal environment, including its business processes, IT infrastructure, and existing security controls. Maintaining and utilizing this information effectively is challenging, particularly in large organizations with complex and distributed environments. Furthermore, many cyber security tools and solutions are designed for use by highly technical users, making them inaccessible to non-technical stakeholders who also need to understand and manage security risks. There is a need for user-friendly interfaces that enable a broader range of users to interact with and benefit from security tools. Given these challenges, there is a clear need for a new solution that can automate and streamline the processes involved in managing cyber security and regulatory risks.

BRIEF SUMMARY

This invention provides an advanced system for managing cyber security and regulatory risks by enabling users to comprehend new information within the context of their specific environment and take appropriate actions. The system automates the retrieval and analysis of both internal information, such as business operations and infrastructure, and external information, including new publications, threat disclosures, and security advisories. It utilizes natural language processing (NLP) to interpret requirements and adapt to changes in the threat landscape. Key functionalities include automated review of security advisories, generating relevant action items, answering security questions for vendor assessments, conducting regulatory gap analysis, and prioritizing the implementation of security controls. Users can interact with the system via natural language interfaces like chatbots for ad-hoc queries, and the system also integrates with workflow management solutions (e.g., Jira, Azure DevOps) for tracking and managing action items.

The system retrieves external documents from trusted sources (e.g., NIST, CISA) via RSS feeds or uploads and internal documents through connectors to platforms like Google Drive, OneDrive, Box, or SharePoint. These documents are stored in centralized locations such as AWS S3 or Google Cloud Storage buckets, where they undergo lifecycle management and enrichment with additional context, such as labelling to indicate relevance to specific products or business units. Real-time threat intelligence and news feeds are integrated to trigger the summarization, prioritization, and extraction of recommended action items for new advisories. Document retrieval is prioritized based on features like date, author, and location, ensuring that the most relevant and authoritative documents are used to augment the system's language model. This augmentation process involves both large language models (LLMs) and smaller, specialized models, which are fine-tuned using historical data, such as past security questionnaires and audit results. The model is continuously updated and retrained based on new information and completed work items. The invention addresses several critical challenges in cyber security and regulatory risk management, including the overwhelming volume and complexity of security advisories, the need for compliance with diverse regulatory frameworks, and the resource-intensive nature of manual risk assessments. By automating these processes, the system enhances operational efficiency, reduces the likelihood of errors, and ensures timely responses to emerging threats. It also makes sophisticated cyber security tools accessible to non-technical users through intuitive, natural language interactions, thereby broadening the range of stakeholders who can effectively manage security risks.

Features of the Automated System for Cyber Security and Regulatory Risk Management include:

Retrieving and Storing Internal and External Documents from a Variety of Sources: This feature involves the system's ability to automatically gather documents from both internal and external repositories. For instance, internal documents such as policy manuals, incident reports, and compliance records are retrieved from platforms like Google Drive, OneDrive, Box, and SharePoint. External documents are sourced from reliable entities such as NIST and CISA through RSS feeds or direct uploads, including compliance guidelines, security advisories, and vulnerability feeds. By automating this retrieval and storage process, the system ensures that all necessary information is collected and centralized, enabling comprehensive data management. For example, the system accesses an internal SharePoint site to retrieve the latest company policy documents and incident reports. Simultaneously, it fetches the latest security advisories and compliance updates from NIST via RSS feeds, storing all documents securely in AWS S3 buckets with appropriate lifecycle management policies. In some embodiments, information about advisories may be stored in as relational database such as MySQL or AzureDB as the description is typically contained directly in the feed items.

Enriching the Retrieved Documents with Contextual Labels: Once documents are retrieved, the system enriches them by adding contextual labels. These labels indicate the relevance of each document to specific products, business units, or whether they describe the current or desired state of the organization's security posture. This enrichment process organizes the documents, making it easier to search, analyze, and generate actionable insights. For example, a newly retrieved data protection policy is labeled to indicate its relevance to the IT and HR departments and its role in describing the current security posture. Similarly, a security advisory about a new software vulnerability is labeled with the affected product and the recommended mitigation steps.

Augmenting a Language Model with the Enriched Documents and Fine-Tuning the Model Using Historical Data: The system uses enriched documents to augment an existing language model. This involves integrating the documents into the model's knowledge base and fine-tuning it using historical data, such as past security questionnaires and audit results. This process enhances the model's accuracy and contextual understanding, enabling it to generate more precise and relevant insights. For example, the system incorporates recent audit results and past security questionnaires into its language model. By doing so, the model becomes better at predicting potential compliance gaps and recommending specific improvements based on historical patterns.

Integrating Real-Time Threat Intelligence and News Feeds into the System: Real-time threat intelligence and news feeds are integrated to keep the system updated with the latest threats and regulatory changes. This integration allows the system to continuously monitor for new advisories, prioritize their relevance, and extract actionable recommendations in real-time. For example, the system receives a real-time feed from CISA, alerting it to a newly discovered critical vulnerability in a popular database software. It immediately analyzes the advisory, assesses its relevance to the organization's infrastructure, and extracts recommended actions such as applying patches and conducting vulnerability scans.

Analyzing Security Advisories and Regulatory Requirements to Generate Actionable Insights and Recommendations: The system analyzes security advisories and regulatory requirements to assess their impact on the organization. It performs automated reviews to determine relevance, conducts gap analysis to identify discrepancies between current policies and regulatory requirements, and generates actionable insights and recommendations tailored to the organization's needs. For example, upon receiving a new GDPR compliance update, the system analyzes the current data protection policies against the new requirements. It identifies gaps in the current policies and recommends specific actions, such as updating data handling procedures and implementing new security controls.

Further, in some embodiments, the system may include a machine translation feature to handle advisories and compliance documents issued by foreign entities, such as BSI.de, which is the German equivalent of CISA and publishes advisories in German. This feature leverages advanced natural language processing (NLP) and machine translation technologies to automatically translate these documents into the organization's primary language. By doing so, it ensures that critical security information from international sources is accessible and understandable to the organization's security and compliance teams, regardless of language barriers. For example, when BSI.de releases a new advisory in German, the system automatically retrieves the document, translates it into English (or the organization's preferred language), enriches it with contextual labels, and integrates it into the existing workflow. This translation capability allows the organization to benefit from a global perspective on cyber threats and regulatory changes, ensuring a comprehensive and up-to-date security posture. The system can also provide real-time updates and alerts in the translated language, facilitating timely and informed decision-making based on a wider range of international advisories and compliance requirements.

Integrating the Analysis Results with Workflow Management Solutions to Generate and Track Work Items: The system integrates the results of its analysis with workflow management tools like Jira or Microsoft Azure DevOps. This integration ensures that all identified actions are tracked and managed efficiently. Work items are generated automatically and assigned to the relevant team members, with progress tracked until completion. For example, following the analysis of a new security advisory, the system creates a Jira ticket for the IT security team to apply the recommended patches. Another ticket is generated for the compliance team to update the relevant security policies. The progress of these tasks is tracked within the workflow management tool, ensuring accountability and timely completion.

Providing an Ad-Hoc Natural Language Interface for User Queries and Real-Time Interaction with the System: The system includes an ad-hoc natural language interface, such as a chatbot, that allows users to interact with the system in real-time. Users can ask questions about compliance gaps, necessary actions, or specific security-related information, and receive immediate, contextually relevant responses. For example, a compliance officer uses the chatbot interface to inquire about the organization's current status regarding a new compliance framework. The system quickly analyzes the request and provides a detailed response highlighting any compliance gaps and the actions needed to address them.

BRIEF DESCRIPTION OF THE ACCOMPANYING DRAWINGS

The novel features which are believed to be characteristic of the present invention, as to its structure, organization, use, and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

Figure 1:
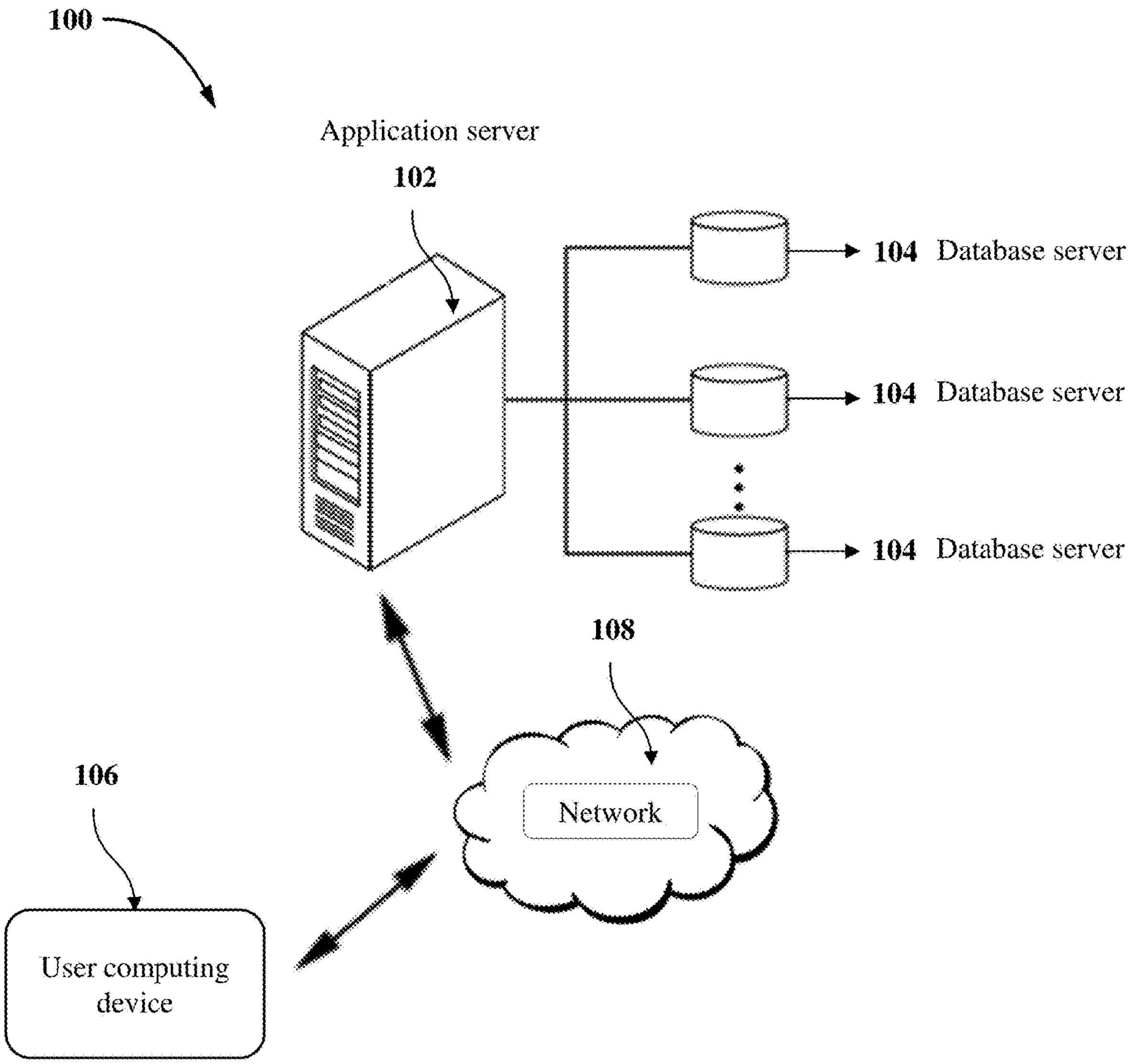
FIG. 1 is a schematic representation showcasing a system environment within which different embodiments of the present invention can be implemented and operationalized.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an", and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, to improve the understanding of the present invention. There may be additional components described in the foregoing application that are not depicted on one of the described drawings. In the event such a component is described, but not depicted in a drawing, the absence of such a drawing should not be considered as an omission of such design from the specification.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. Unless stated otherwise, terms such as "first" and "second" are used to arbitrarily distinguish between the elements. Thus, these terms are not necessarily intended to indicate temporal or other prioritization of such elements. While various exemplary embodiments of the disclosed invention have been described below it should be understood that they have been presented for purposes of example only, not limitations. It is not exhaustive and does not limit the invention to the precise form disclosed. Modifications and variations are possible considering the above teachings or may be acquired from practicing of the invention, without departing from the breadth or scope.

Before describing the present invention in detail, it should be observed that the present invention utilizes a combination of components or set-ups, which constitutes an automated cyber security and regulatory risk management system. The invention includes the automated retrieval of both external and internal information. External documents are sourced from trusted organizations such as NIST and CISA via RSS feeds or document uploads, including compliance documentation, news articles, new regulatory frameworks, security advisories, and CVE feeds. Simultaneously, internal documents are gathered from repositories using connectors for platforms like Google Drive, OneDrive, Box, or SharePoint, encompassing policy documents, business white papers, previous Q&A responses to customers, design documents, and planning/engineering artifacts (e.g., Jira tickets). These documents are then securely stored in centralized locations such as AWS S3 buckets or Google Cloud Storage buckets, where lifecycle policies are enforced based on document type. Next, the documents undergo enrichment and labeling to add context, such as indicating relevant products or business units. This enriched information is used to augment an existing large language model (LLM) or create small language models (SLMs), which are fine-tuned with historical data from past security questionnaires and audit results. Real-time threat intelligence and news feeds are integrated into the system, triggering summarization, prioritization based on applicability, and extraction of recommended action items when new advisories are received. The system automatically reviews these security advisories to assess relevance and generate specific action items for the organization. It also conducts automated gap analysis by comparing regulatory requirements with the organization's policies and security controls, identifying discrepancies, and suggesting improvements. The results of these analyses are integrated with workflow management solutions like Jira or Microsoft Azure DevOps, where work items are generated and tracked. The model is continuously updated and retrained as work items are completed, reflecting the latest security posture and actions taken. For ad-hoc queries, a chat interface allows users to interact with the system in natural language, asking questions about compliance gaps, action items from news articles, or specific information like the date of the last penetration test. The system periodically scans for new documents and updates the model or uses event triggers to ensure it remains current with the latest information. Finally, the system performs real-time analysis of new threat advisories or regulatory updates, providing summarization, classification, and actionable recommendations, and prioritizes and reports on vulnerabilities and incidents, especially those related to the organization's dependencies such as SaaS platforms. This comprehensive process ensures that organizations can proactively manage cyber security and regulatory risks efficiently and effectively.

The invention will now be described with reference to the accompanying drawings which should be regarded as merely illustrative without restricting the scope and ambit of the present invention.

FIG. 1 is a schematic representation, labeled 100, showcasing the system environment within which different embodiments of the present invention can be implemented and operationalized. The system environment 100 includes an application server 102, a database server 104, and a user-computing device 106. There is further shown a communication network 108 via which the application server 102, the database server 104, and the user-computing device 106 communicate with each other.

The application server 102 serves as the central processing unit of the modular software framework, orchestrating the primary operations and workflows integral to the automated system for managing cyber security and regulatory risks. It is tasked with the execution of the application's logic, interacting with the database server 104 to fetch, process, and store data, and catering to requests from the user-computing device 106. In an embodiment, the application server 102 is a critical component in the system environment that hosts and executes the business logic and application processes. It acts as the intermediary between the user-computing device 106 and the database server 104, processing user requests, running applications, and managing data interactions. Examples of the application server 102 includes web servers (such as Apache Tomcat, Microsoft Internet Information Services (IIS)), enterprise application servers (such as IBM WebSphere, Oracle WebLogic, JBoss EAP), cloud-based servers (such as Amazon Web Services (AWS) Elastic Beanstalk, Google App Engine, Microsoft Azure App Service), and middleware servers (such as IBM MQ, TIBCO, Oracle Fusion Middleware). The application server 102 may be further configured to communicate with the user-computing device 106 and the database server 104 via the communication network 108. This allows seamless data flow and interaction, enabling the system to: serve user requests and provide real-time responses, retrieve and store data efficiently, and maintain secure and reliable communication between system components.

In the context of the present invention, the application server 102 may be configured to host the AI components and modules necessary for the automated cyber security and regulatory risk management system. These components include: (1) Natural Language Processing (NLP) Engine: Processes and understands the textual data from internal and external documents. (2) Machine Learning Models: Augmented and fine-tuned to analyze and interpret security advisories, regulatory requirements, and generate actionable insights. (3) Data Integration and Enrichment Modules: Integrate real-time threat intelligence and news feeds, enrich documents with contextual labels, and prepare data for analysis.

The application server 102 in the present invention performs several key functions within the automated system for managing cyber security and regulatory risks: (1) Document Retrieval and Storage Management: (a) Internal Documents: Retrieves documents from platforms like Google Drive, OneDrive, Box, and SharePoint. These documents include policy documents, business white papers, and security-related artifacts. (b) External Documents: Retrieves documents via RSS feeds or uploads from trusted sources such as NIST, CISA, and other regulatory bodies. These documents include compliance documentation, security advisories, and CVE feeds. (2) Document Enrichment and Labeling: The server processes and labels the retrieved documents to add context, indicating relevance to specific products, business units, or whether they describe the current or desired security posture. (3) Language Model Augmentation and Fine-Tuning: Augments a language model with the enriched documents, fine-tunes it using historical data sets (e.g., past security questionnaires, audit results), and ensures the model is up to date with the latest information. (4) Real-Time Threat Intelligence Integration: Integrates real-time threat intelligence and news feeds into the system. When new advisories are received, the server triggers processes for summarization, prioritization, and extraction of recommended action items. (5) Automated Analysis and Action Generation: Automatically reviews security advisories to assess relevance and generate action items specific to the organization. Performs automated gap analysis by comparing regulatory requirements with the organization's policies and security controls, identifying discrepancies, and suggesting improvements. (6) Workflow Integration: Integrates with workflow management solutions like Jira or Microsoft Azure DevOps, generating and tracking work items based on document classification and analysis results. The server also updates and retrains the model as work items are completed. (7) Ad-Hoc Natural Language Interaction: Provides a natural language interface for user queries and real-time interaction. Users can ask questions about compliance gaps, necessary action items from news articles, or specific security-related information.

The application server 102, as a central component of the automated cyber security and regulatory risk management system, may execute several other embodiments that enhance the overall functionality and effectiveness of the present invention. One such embodiment is the dynamic prioritization engine, which leverages real-time threat intelligence to dynamically adjust the priority of action items based on the evolving threat landscape. This engine may use machine learning algorithms to continuously analyze threat data and re-prioritize security measures, ensuring that the most critical threats are addressed promptly. Another feature is the automated compliance monitoring and reporting module. This module continuously scans internal policies and external regulatory updates, automatically generating compliance reports and highlighting any discrepancies. It can also predict future compliance requirements based on historical data and regulatory trends, providing proactive recommendations to ensure ongoing compliance. The application server 102 can also host an advanced anomaly detection system that integrates with the organization's existing security infrastructure. This system uses deep learning techniques to detect unusual patterns in network traffic, user behavior, and system activity, identifying potential security incidents before they escalate. By correlating these anomalies with real-time threat intelligence, the system can provide context-aware alerts and recommended responses. Furthermore, the application server 102 may support a collaborative security management platform, which facilitates seamless communication and coordination among security teams. This platform includes features such as shared dashboards, real-time collaboration tools, and automated task assignments based on team members' expertise and availability. It enhances the efficiency and effectiveness of the organization's response to security incidents and regulatory changes. Additionally, the application server 102 may implement a personalized security awareness training module. This module tailors training content based on individual user roles, behavior, and past performance in security assessments. It uses gamification techniques and interactive simulations to engage users and reinforce best practices, significantly improving the overall security culture within the organization. The application server 102 may also incorporate a predictive maintenance feature for security systems. By analyzing historical data and system performance metrics, this feature can predict potential failures or vulnerabilities in the organization's security infrastructure. It provides maintenance recommendations and schedules, ensuring that security systems remain robust and effective. These embodiments collectively enhance the capabilities of the automated cyber security and regulatory risk management system, making it a comprehensive solution that not only addresses current security challenges but also proactively adapts to future threats and regulatory requirements.

The database server 104 is a pivotal component of the automated cyber security and regulatory risk management system. It is responsible for storing, managing, and retrieving data that is essential for the operation of the entire system. The database server 104 ensures that all the information processed by the application server 102 is securely and efficiently handled, providing a reliable backbone for data-intensive operations. Data within the system can be stored in various formats to optimize accessibility and performance. Structured data, such as information extracted from RSS feeds, can be stored in relational databases like PostgreSQL or MySQL, which enable efficient querying and management of well-defined data schemas. This structured storage allows for rapid retrieval and analysis of specific data points, supporting detailed reports and insights. Conversely, unstructured data, including large documents and raw advisories, can be stored in blob storage solutions like Amazon S3 or Azure Blob Storage. These storage options are ideal for handling vast amounts of diverse data types, ensuring scalability and cost-effectiveness. By utilizing both structured and unstructured storage, the system can efficiently manage and process a wide range of data formats, enhancing its overall flexibility and capability. Alternatives to traditional databases include NoSQL databases such as MongoDB or Cassandra, which are designed for handling unstructured or semi-structured data, and graph databases like Neo4j, which excel at managing interconnected data, providing additional flexibility in data storage and retrieval strategies, but should not be construed as limiting to the scope of the present invention.

The primary function of the database server 104 is to store large volumes of data, including internal documents retrieved from platforms like Google Drive, OneDrive, Box, or SharePoint, and external documents sourced from RSS feeds or trusted entities such as NIST and CISA. This data includes policy documents, security advisories, compliance records, business white papers, previous Q&A responses to customers, design documents, and planning/engineering artifacts like Jira tickets. The database server 104 may be further configured to organize this data using advanced database management systems (DBMS) that support both structured and unstructured data. This organization ensures that data can be efficiently queried and retrieved by the application server 102 when needed for processing and analysis. The DBMS employed might include relational databases like PostgreSQL or MySQL, as well as NoSQL databases like MongoDB or Elasticsearch, depending on the nature and requirements of the data.

With the sensitive nature of the data handled, the database server 104 may be configured to implement robust security measures to protect against unauthorized access and data breaches. This includes encryption of data at rest and in transit, access control mechanisms, and regular security audits. Compliance with relevant data protection regulations such as GDPR, HIPAA, and PCI-DSS is also ensured through stringent data governance policies. Lifecycle management is another critical aspect managed by the database server 104. Different types of documents have varying lifespans; for instance, internal policies might need to be retained for a year, whereas security advisories could be valid only for a few weeks. The server enforces these lifecycle policies automatically, archiving or deleting data as required, which helps in maintaining an organized and efficient data storage system.

The database server 104 is designed to handle high-performance requirements, ensuring that data retrieval and storage operations do not become a bottleneck for the system. Techniques such as indexing, partitioning, and caching are employed to enhance performance. Additionally, the server is built to scale horizontally and vertically, accommodating growing data volumes and increasing numbers of transactions as the system expands. This scalability is crucial for maintaining the system's responsiveness and reliability under heavy load conditions. To support the diverse data sources and types, the database server 104 integrates seamlessly with various data ingestion tools and APIs. This interoperability ensures that data from different platforms and formats can be ingested, normalized, and stored in a unified manner. The server also supports data enrichment processes where contextual labels and metadata are added to documents, enhancing their usability for subsequent analysis by the application server 102. The database server 104 includes comprehensive backup and disaster recovery solutions. Regular backups are taken and stored securely, allowing for quick restoration in case of data loss or corruption. Disaster recovery plans are in place to ensure business continuity, with failover mechanisms and redundant systems ready to take over in the event of a server failure. The database server 104 further plays a critical role in supporting advanced analytics. By storing enriched and labeled data, it provides a rich dataset for machine learning models and other analytical tools hosted on the application server 102. The server supports complex queries and data transformations, enabling in-depth analysis and generation of actionable insights. This capability is essential for features such as real-time threat analysis, compliance monitoring, and predictive maintenance.

The user computing device 106 is an essential interface between the end-users and the automated cyber security and regulatory risk management system. It provides the platform through which users interact with the system, accessing data, receiving insights, and executing actions based on the system's recommendations. This device can be a desktop computer, laptop, tablet, or smartphone, depending on the user's preference and the organization's infrastructure. The primary role of the user computing device 106 is to facilitate user interaction with the system. It provides access to the user interface (UI) of the application server 102, which includes dashboards, reports, alerts, and interactive features. The UI is designed to be intuitive and user-friendly, ensuring that users of varying technical expertise can navigate and utilize the system effectively. Features such as natural language processing (NLP) interfaces and chatbots are accessible through this device, allowing users to query the system in plain language and receive relevant responses.

One of the important functions of the user computing device 106 is to display data visualizations and reports generated by the system. These visualizations can include charts, graphs, and tables that represent security status, compliance levels, and identified threats. The device enables users to drill down into specific data points for detailed analysis, providing a comprehensive understanding of the organization's security posture. Customized reports can be generated and viewed on the device, helping users to monitor key metrics and make informed decisions. The user computing device 106 may be also responsible for receiving real-time alerts and notifications from the system. These alerts can pertain to new security advisories, detected vulnerabilities, compliance issues, or required actions. By delivering timely notifications, the device ensures that users are immediately aware of critical issues that need attention.

The device can be configured to receive these alerts through various channels, such as email, SMS, or push notifications, ensuring that users remain informed regardless of their location.

Further, through the user computing device 106, users can manage workflows and tasks generated by the system. The device provides access to workflow management solutions like Jira or Microsoft Azure DevOps, where users can view, update, and complete tasks related to security and compliance actions. This integration allows for seamless task management, ensuring that all actions recommended by the system are tracked and executed efficiently. Users can also collaborate with team members, assign tasks, and monitor progress directly from their device. Further, with the sensitive nature of the data accessed through the user computing device 106, robust security measures may be implemented to protect against unauthorized access. The device supports multi-factor authentication (MFA), ensuring that only authorized users can access the system. Additionally, encryption is used to secure data transmitted between the user computing device and the application server 102. Regular security updates and patches are applied to the device to mitigate vulnerabilities and protect against potential threats.

The user computing device 106 may also allow for customization and personalization of the user interface and experience. Users can configure dashboards, set preferences for alerts and notifications, and tailor the system's features to their specific roles and responsibilities. This customization enhances user engagement and ensures that the system meets the unique needs of different users within the organization. The user computing device 106 may also support remote access, enabling users to interact with the system from any location with an internet connection. This mobility ensures that users can respond to alerts, manage tasks, and access critical data while on the move, providing flexibility and continuity in security and compliance management. The user computing device 106 may be also used as a platform for delivering training and support to users. Interactive tutorials, user guides, and support resources are accessible through the device, helping users to understand and effectively use the system. Additionally, the device can facilitate support interactions, allowing users to report issues and receive assistance from technical support teams.

The communication network 108 enables seamless connectivity and data exchange between the application server 102, the database server 104, and the user computing device 106. This network 108 ensures that all components of the automated cyber security and regulatory risk management system can communicate efficiently, facilitating real-time data transfer, processing, and interaction. The communication network 108 can comprise both wired and wireless network technologies, each playing a crucial role in maintaining robust and reliable connections within the system.

The communication network 108 may be configured to ensure the security and integrity of data being transmitted between the system's components. This involves implementing encryption protocols such as TLS (Transport Layer Security) to protect data in transit. Network security measures, including firewalls, intrusion detection systems (IDS), and virtual private networks (VPNs), are employed to safeguard against unauthorized access and cyber threats. Reliability is another critical aspect of the communication network 108. Redundancy and failover mechanisms are put in place to maintain connectivity in case of network failures. This includes using multiple network paths and backup connections to ensure that the system remains operational and responsive under all conditions.

The communication network 108 is further designed to scale with the organization's needs. As data volumes and user interactions grow, the network can expand to accommodate increased traffic and ensure consistent performance. This scalability is achieved through network infrastructure that supports high bandwidth and low latency, essential for the system's real-time data processing and interaction requirements. The network 108 may further integrate various network technologies to provide a cohesive communication environment. It supports interoperability between different devices and platforms, ensuring that the application server 102, database server 104, and user computing device 106 can seamlessly communicate regardless of their underlying network connections. This integration is vital for maintaining the system's functionality and user experience.

The operation of the invention encompasses a series of automated processes designed to manage cyber security and regulatory risks effectively. The operation begins with the retrieval of both internal and external documents. The retrieval module on the application server 102 accesses internal documents stored in various platforms such as Google Drive, OneDrive, Box, and SharePoint using connectors. These internal documents include policy documents, business white papers, security-related artifacts, and other relevant data. Simultaneously, the application server 102 retrieves external documents from trusted sources via RSS feeds or direct uploads. These sources include regulatory bodies like NIST and CISA, providing compliance documentation, security advisories, news articles, and CVE feeds. Once retrieved, the documents may be securely stored in centralized locations managed by the database server 104. The storage module on the database server enforces lifecycle policies, ensuring that documents are retained or archived based on their type and relevance. For instance, internal policies might be retained for a year, whereas security advisories might only be valid for a few weeks. The next step involves enriching these documents with additional context through a document enrichment module. The application server 102 may process the documents, adding labels that indicate relevance to specific products, business units, or the security posture of the organization. This enrichment process helps in organizing the data and making it more accessible for analysis. The enriched documents are then used to augment and fine-tune a language model. The language model module on the application server 102 may integrate these documents, using historical data sets such as past security questionnaires and audit results to fine-tune the model. This enhanced model may be capable of interpreting complex regulatory requirements and security advisories, generating actionable insights. Further, real-time threat intelligence and news feeds are integrated into the system via a threat intelligence module on the application server 102. This module continuously monitors for new advisories and updates, triggering real-time analysis processes. It summarizes the information, prioritizes it based on relevance, and extracts recommended action items, ensuring that the organization remains up to date with the latest threats and regulatory changes. Further, the analysis module on the application server 102 may play an important role in reviewing security advisories and performing automated gap analysis. It compares regulatory requirements with the organization's existing policies and security controls, identifying discrepancies and suggesting improvements. The module generates specific action items and recommendations tailored to the organization's context. These action items and recommendations are then integrated into workflow management solutions like Jira or Microsoft Azure DevOps through a workflow integration module. This module generates and tracks work items based on the analysis results, ensuring that necessary actions are assigned, monitored, and completed. The system updates and retrains the language model as work items are completed, maintaining an accurate and current security posture.

Further, user interaction with the system is facilitated through the user computing device 106, which accesses the application server 102 via the communication network 108. The user computing device provides an intuitive user interface, displaying dashboards, reports, and alerts. Users can manage workflows, receive real-time notifications, and interact with the system through a natural language interface, such as a chatbot. This ad-hoc interaction allows users to query the system about compliance gaps, necessary actions, or specific security-related information, receiving immediate and relevant responses. The communication network 108 ensures seamless data exchange between all components of the system. It comprises both wired and wireless technologies, such as Ethernet, fiber optic networks, Wi-Fi, and cellular networks, providing robust and reliable connectivity. The network employs encryption and security measures to protect data in transit, ensuring secure communication.

Figure 2:
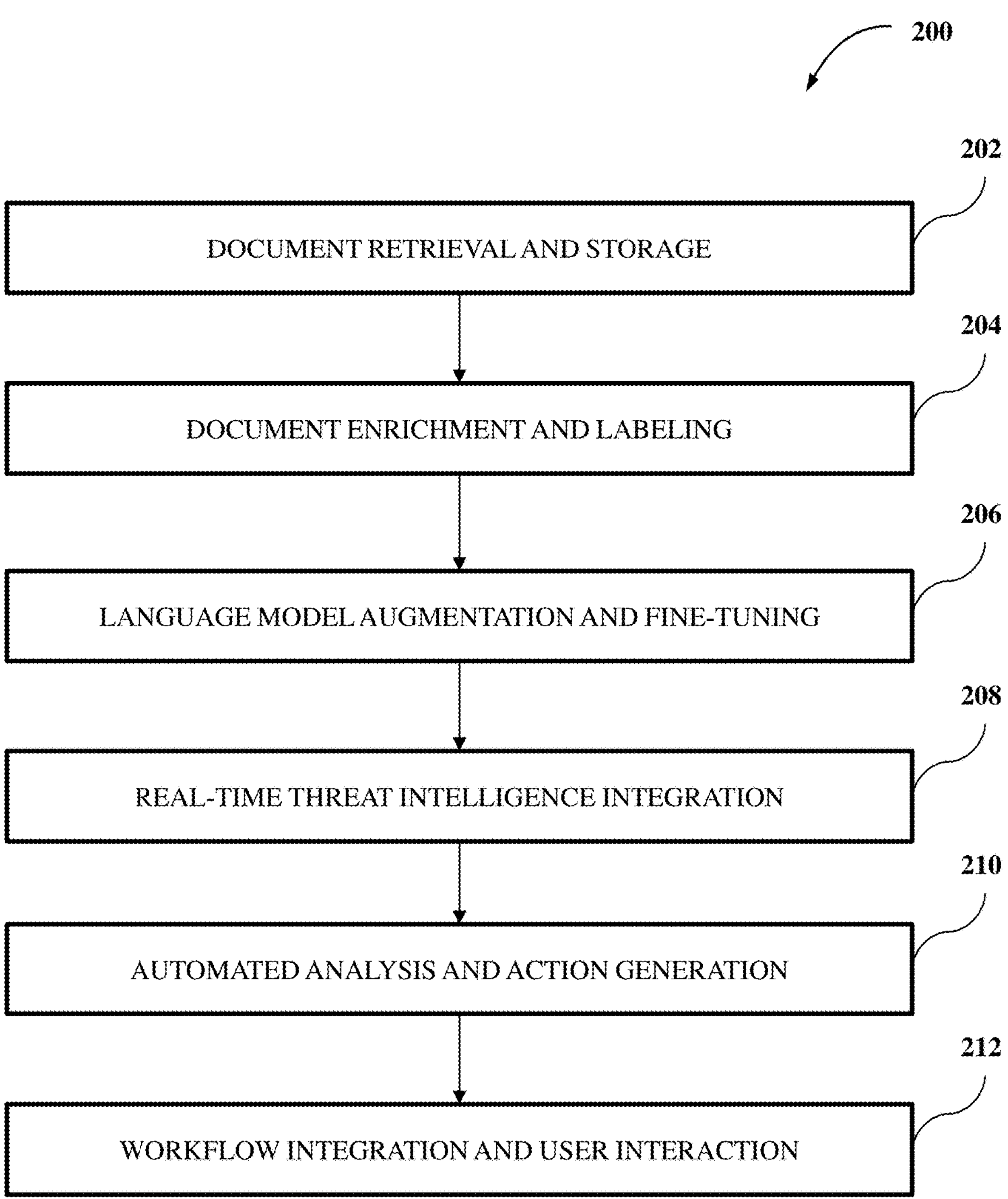
FIG. 2 is a diagram that illustrates a flowchart of a method of an automated system for managing cyber security and regulatory risks, in accordance with an embodiment of the present invention.

FIG. 2 is a diagram that illustrates a flowchart of a method of the automated system for managing cyber security and regulatory risks, in accordance with an embodiment of the present invention.

At step 202, the documents are retrieved and stored. The documents retrieval includes internal documents and external documents. The internal document retrieval process involves accessing various internal repositories within an organization to gather essential documents. These repositories include widely used cloud storage platforms such as Google Drive, OneDrive, Box, and SharePoint. The system utilizes connectors to seamlessly interface with these platforms, enabling it to fetch documents efficiently. The types of documents retrieved from these repositories include policy documents that outline the organization's internal rules and procedures, business white papers that provide in-depth information on specific topics, and security-related artifacts such as incident reports and risk assessments. By automating the retrieval of these critical documents, the system ensures that it has a comprehensive understanding of the organization's current policies and security posture, which is crucial for subsequent analysis and action generation. In addition to internal documents, the system also collects relevant information from trusted external sources to stay updated with the latest developments in cyber security and regulatory requirements. This is achieved through RSS feeds and direct document uploads from authoritative entities such as the National Institute of Standards and Technology (NIST) and the Cybersecurity and Infrastructure Security Agency (CISA). The documents retrieved include compliance documentation that details regulatory requirements, security advisories that inform about new threats and vulnerabilities, news articles that provide context on the current threat landscape, and Common Vulnerabilities and Exposures (CVE) feeds that list known security weaknesses. By incorporating this external information, the system ensures that it remains informed about external factors that could impact the organization's security and compliance status. Once retrieved, all documents—both internal and external—are stored in centralized locations for efficient management and accessibility. This centralized storage is typically implemented using robust cloud storage solutions such as AWS S3 buckets or Google Cloud Storage. These platforms provide secure, scalable, and reliable storage, ensuring that documents are readily available for processing and analysis. Furthermore, the system enforces lifecycle policies to manage the retention and archiving of documents based on their type and relevance. For instance, internal policy documents might be retained for a year, reflecting their long-term importance, while security advisories, which are more time-sensitive, might only be kept for a few weeks. This structured approach to storage management ensures that the system maintains an organized and up-to-date repository of documents, facilitating effective data processing and decision-making.

At step 204, the documents are enriched and labelled. In an embodiment, contextual labeling is a crucial step in the document enrichment process where each document retrieved by the system is augmented with specific labels that add context and relevance. These labels are carefully assigned to indicate various attributes such as the document's relevance to specific products, business units, or its relation to the organization's security posture. For instance, a policy document might be labeled to specify which department or business unit it applies to, or a security advisory might be tagged with the particular products or services it impacts. Additionally, documents are labeled to denote whether they describe the current state of the organization's security measures or outline desired future states. This detailed contextual labeling helps in organizing the documents, making it easier for the system to perform accurate and relevant analyses, and ensures that subsequent actions and recommendations are appropriately targeted. Segmentation involves breaking down documents into smaller, more manageable parts to enhance the granularity of labeling and subsequent analysis. By dividing documents into segments, the system can apply more precise labels to each part, which improves the overall accuracy and usability of the data. For example, a lengthy compliance document might be segmented into sections that each cover different regulatory requirements, allowing for specific labels to be assigned to each section. This process ensures that even within a single document, distinct parts can be identified and analyzed independently, enhancing the system's ability to pinpoint relevant information and generate detailed, actionable insights. Segmentation also aids in better indexing and retrieval of information, as users and automated processes can access and utilize specific parts of a document without needing to parse through the entire content. This granular approach significantly improves the efficiency and effectiveness of the system in managing and mitigating cyber security and regulatory risks.

At step 206, language models are augmented and fine-tuned. In an embodiment, model augmentation is a sophisticated process that enhances an existing large language model (LLM) or creates small language models (SLMs) by incorporating the enriched documents. This involves feeding the language model with the enriched documents that have been contextually labeled and segmented. The enriched documents provide the model with a wealth of specific and relevant data, enhancing its understanding of the organization's unique security posture and regulatory requirements. By integrating this enriched information, the language model is better equipped to comprehend and generate responses that are contextually accurate and relevant to the specific needs of the organization. This augmented model becomes adept at understanding nuanced security advisories, compliance documentation, and internal policy documents, thereby improving its overall utility and effectiveness in generating actionable insights and recommendations. Further, fine-tuning the language model involves a detailed process of adjusting the model using historical data sets to enhance its accuracy and contextual understanding. This step leverages past security questionnaires, audit results, incident reports, and other relevant historical data to refine the model's predictive capabilities and response accuracy. Fine-tuning adjusts the model's parameters so that it can better understand and interpret the specific language and context used in the organization's documents. By incorporating historical data, the model learns from previous patterns, outcomes, and expert evaluations, which helps it make more informed predictions and recommendations. For example, fine-tuning with past audit results enables the model to identify common compliance gaps and suggest targeted improvements. This process ensures that the language model is not only accurate in its general language capabilities but also finely tuned to the specific terminologies, regulatory frameworks, and security contexts pertinent to the organization. The outcome is a highly customized and precise tool that significantly enhances the organization's ability to manage cyber security and regulatory risks effectively.

At step 208, the real-time threat intelligence is integrated. In an embodiment, integrating real-time threat intelligence feeds into the system is a crucial aspect of maintaining an up-to-date and responsive cyber security posture. These feeds provide continuous updates from various trusted sources, including security organizations, regulatory bodies, and specialized threat intelligence providers. By incorporating real-time feeds, the system receives the latest information on emerging threats, vulnerabilities, and regulatory changes as soon as they are published. Examples of these sources include the National Institute of Standards and Technology (NIST), Cybersecurity and Infrastructure Security Agency (CISA), and other relevant security advisories and news outlets. The integration of these feeds ensures that the system is constantly aware of new developments in the threat landscape, allowing it to adapt and respond swiftly. This continuous flow of information is essential for proactive threat management, helping the organization stay ahead of potential security issues and compliance challenges. Further, real-time analysis is the process that activates as soon as new threat intelligence or regulatory advisories are received. This involves several automated steps designed to handle the influx of new information efficiently and effectively. First, the system triggers summarization processes that distill the essential details from lengthy and complex advisories. This helps in quickly understanding the core message and implications of the new information. Next, prioritization mechanisms come into play, evaluating the relevance and urgency of the new advisories based on the organization's specific context, existing security posture, and the criticality of the assets involved. The system uses predefined criteria and machine learning algorithms to rank these threats and advisories, ensuring that the most significant issues receive immediate attention. Once prioritization is complete, the system proceeds to extract recommended action items. This involves identifying specific steps that the organization should take in response to the new advisories, such as updating security controls, applying patches, or modifying compliance policies. These action items are then communicated to relevant stakeholders through the workflow integration module, which generates and tracks the necessary tasks within tools like Jira or Microsoft Azure DevOps. The real-time analysis capability ensures that the organization can swiftly transition from awareness to action, mitigating threats and addressing compliance requirements proactively. By automating this process, the system significantly reduces the time and effort required to manage new threats, enhancing the organization's overall security and regulatory compliance posture.

At step 210, the automated analysis and action generation are performed. In an embodiment, the automated analysis and action generation process begins with the automatic review of security advisories. As new advisories are received from various trusted sources, the system immediately processes them to determine their relevance to the organization. Using advanced natural language processing (NLP) and machine learning algorithms, the system analyzes the content of each advisory, extracting key details such as the nature of the threat, affected systems, and recommended mitigations. It then cross-references this information with the organization's existing security posture, infrastructure, and assets to assess the advisory's applicability. By doing so, the system can quickly identify which advisories are pertinent to the organization and prioritize them accordingly. This automated review process ensures that no critical advisory is overlooked and that relevant threats are promptly addressed. Following the review of security advisories, the system performs an automated gap analysis. This involves a thorough comparison of current regulatory requirements with the organization's established policies and implemented security controls. The system leverages its comprehensive database of internal documents, enriched with contextual labels, to evaluate how well the organization's existing measures align with the latest regulatory standards. During this process, the system identifies any discrepancies or gaps where the organization's practices fall short of compliance requirements. This could include missing controls, outdated policies, or insufficient security measures. By systematically highlighting these gaps, the system provides a clear understanding of the areas that need improvement to meet regulatory compliance and enhance overall security. Based on the results of the security advisory review and gap analysis, the system generates actionable insights and recommendations tailored to the organization's specific context. This step involves translating the identified gaps and relevant advisories into concrete action items that can be easily understood and implemented by the organization's security and compliance teams. For instance, if a gap analysis reveals that certain security controls are outdated, the system might recommend specific updates or the implementation of new controls. Similarly, if a security advisory highlights a vulnerability in a software component used by the organization, the system will generate action items such as applying patches or conducting additional security assessments. These action items are then integrated into the organization's workflow management tools, such as Jira or Microsoft Azure DevOps, where they are assigned to relevant team members, tracked, and monitored until completion. This seamless integration ensures that all recommended actions are managed efficiently and transparently, with clear accountability and progress tracking. The system's ability to generate precise, context-aware recommendations significantly enhances the organization's capacity to respond to threats and maintain compliance, ultimately strengthening its overall security posture. By automating these processes, the system not only saves time and resources but also ensures a higher level of accuracy and responsiveness in managing cyber security and regulatory risks.

At step 212, the workflow integration and user interaction are performed. The workflow management integration is a critical component of the automated cyber security and regulatory risk management system. After performing the automated analysis and generating actionable insights, the system integrates these results with established workflow management solutions such as Jira or Microsoft Azure DevOps. This integration allows the system to automatically generate work items based on the identified action items. These work items are then assigned to the appropriate team members within the organization, ensuring that each task is clearly defined, and responsibilities are allocated effectively. The workflow management tools provide a platform for tracking the progress of these tasks, from assignment to completion, ensuring that all necessary actions are documented and followed through. This integration not only enhances efficiency but also provides transparency and accountability, as team members can monitor the status of each task and managers can oversee the overall progress of security and compliance initiatives. In addition to the structured workflow management, the system offers a natural language interface, such as a chatbot, to facilitate ad-hoc interaction with users. This interface allows users to engage with the system in real-time, using everyday language to query the system about various aspects of cyber security and regulatory compliance. For instance, users can ask questions about current compliance gaps, necessary actions based on recent security advisories, or specific security-related information such as the date of the last penetration test. The natural language processing (NLP) capabilities of the system enable it to understand and respond to these queries accurately and contextually. This real-time interaction capability significantly enhances user experience, making it easier for non-technical stakeholders to access critical information and make informed decisions without needing in-depth technical knowledge. To ensure that users are promptly informed about critical issues, the system employs real-time notifications. These notifications are sent to user computing devices via various channels, including email, SMS, or push notifications, depending on user preferences and the urgency of the issue. Real-time alerts are crucial for informing users about immediate threats, compliance violations, or important updates that require swift action. For example, if a new high-severity vulnerability is discovered in a system component, the system will immediately notify the relevant security personnel, providing details about the vulnerability and recommended mitigation steps. By delivering timely notifications, the system helps ensure that critical issues are addressed as soon as they arise, minimizing potential risks and enhancing the organization's overall security posture. These real-time alerts are integral to maintaining a proactive approach to cyber security and regulatory compliance, allowing the organization to respond quickly to emerging threats and changes in the regulatory landscape.

In exemplary operation, for document retrieval and storage, consider a scenario where a company needs to gather and manage its internal security policies and external compliance requirements. The system accesses internal repositories such as Google Drive and SharePoint, retrieving documents like the company's data protection policy, incident response plan, and recent audit reports. Simultaneously, it collects external documents from trusted sources like NIST and CISA via RSS feeds, obtaining compliance frameworks, new security advisories, and CVE lists. These documents are then securely stored in AWS S3 buckets, with lifecycle policies ensuring that older documents are archived or deleted as needed, maintaining an organized and up-to-date repository. Once the documents are stored, the system enriches them with contextual labels. For example, a data protection policy might be labeled as relevant to the HR and IT departments and marked as describing the current security posture. Similarly, a security advisory about a new vulnerability in a commonly used software could be labeled with the affected product and the recommended mitigation steps. The system also segments lengthy documents, such as compliance frameworks, into smaller sections, each labeled with specific regulatory requirements. This detailed labeling makes it easier to search and analyze documents, ensuring that the relevant information is quickly accessible when needed. With enriched and labeled documents, the system augments its language model. Suppose the company has historical data from past security questionnaires and audit results. This data is used to fine-tune the language model, improving its ability to understand and interpret specific security and compliance terminologies used within the organization. For instance, by learning from previous audits, the model can better predict potential compliance gaps and recommend specific improvements. This enhanced language model becomes a powerful tool for generating accurate and contextually relevant insights. The system then integrates real-time threat intelligence feeds, ensuring it remains updated with the latest threats. For example, when a new vulnerability is reported by CISA affecting a widely used operating system, the system receives this advisory in real-time. It then triggers processes to summarize the advisory, prioritize its relevance based on the company's use of the affected OS, and extract recommended action items, such as applying specific patches. This proactive approach allows the company to address emerging threats swiftly, minimizing potential risks. Next, the system performs an automated analysis. Suppose it receives a new security advisory about a critical vulnerability in a database software used by the company. The system automatically reviews the advisory, assesses its relevance, and identifies that the company's current security controls do not fully address this vulnerability. It performs a gap analysis, comparing the advisory's recommended actions with the existing policies and controls, highlighting a need for an immediate patch and additional monitoring. The system generates actionable insights, recommending specific steps such as scheduling the patch deployment and updating the database security policies. Finally, the system integrates these action items into the company's workflow management tool, such as Jira. For instance, it creates a new Jira ticket assigned to the IT security team to deploy the patch and another ticket to update the security policy document. Users can track the progress of these tasks, ensuring that all necessary actions are completed. Additionally, suppose a compliance officer wants to check the company's readiness for an upcoming audit. They can interact with the system via a chatbot, asking about the current compliance status. The system provides real-time information, highlighting any gaps and ongoing remediation efforts. Furthermore, if a critical issue arises, such as a new high-severity vulnerability, the system sends real-time notifications to relevant stakeholders via email and push notifications, ensuring immediate attention and action.

To enhance the robustness and comprehensiveness, several other novel technical features may be considered. One such feature is the implementation of adaptive learning algorithms that dynamically adjust based on new data inputs and user interactions. This capability would allow the system to continuously improve its accuracy and relevance in predicting security threats and compliance gaps, adapting to the evolving threat landscape and regulatory requirements without manual intervention. Another feature is the incorporation of a multi-factor authentication (MFA) system for accessing the AI-powered platform. This security measure would ensure that only authorized personnel can interact with the system, adding an additional layer of protection against unauthorized access and potential data breaches. Additionally, integrating blockchain technology for document storage and tracking could enhance the integrity and traceability of compliance documents and security advisories, ensuring that all modifications and accesses are securely recorded and immutable. In some embodiments, anomaly detection and response automation may also be valuable. By leveraging advanced machine learning techniques, the system could identify unusual patterns in network traffic, user behavior, or system activity that may indicate a security threat. Once an anomaly is detected, the system could automatically initiate predefined response protocols, such as isolating affected systems, notifying relevant personnel, and generating detailed incident reports. This feature would significantly reduce response times and minimize potential damage from security incidents. Also, incorporating predictive analytics to forecast future compliance trends and potential security threats based on historical data and current trends would provide organizations with proactive insights. This feature could help organizations anticipate and prepare for upcoming regulatory changes or emerging threats, ensuring they remain ahead of potential risks. In some embodiments, the addition of an integrated simulation and training module could further strengthen the disclosed system implementation. This module would use real-world scenarios to train security and compliance teams, providing interactive simulations that help them practice responding to various threats and compliance challenges. This hands-on training approach would enhance the preparedness and effectiveness of the teams, contributing to a more resilient organizational security posture. Another significant enhancement may be the integration of advanced data visualization tools that present security and compliance data in interactive, easy-to-understand formats. These tools could include dynamic dashboards, heat maps, and trend graphs that help stakeholders quickly grasp complex information and make informed decisions. This feature would improve the accessibility and usability of the system for both technical and non-technical users. Another feature may be the development of a cross-referencing capability that links security advisories and compliance documents with specific components of the organization's IT infrastructure. By mapping advisories and regulatory requirements to specific systems, applications, and processes, the system could provide highly targeted recommendations and ensure that critical vulnerabilities are addressed promptly. This cross-referencing could also facilitate more efficient audits and compliance checks by highlighting the most relevant areas for inspection. Further, the inclusion of a feedback loop mechanism that incorporates user inputs and outcomes into the system's learning process could significantly enhance its effectiveness. Users could provide feedback on the relevance and accuracy of the system's recommendations, which would then be used to refine and improve the underlying algorithms. This iterative improvement process would ensure that the system evolves based on real-world experiences and becomes more accurate and reliable over time.

Figure 3:
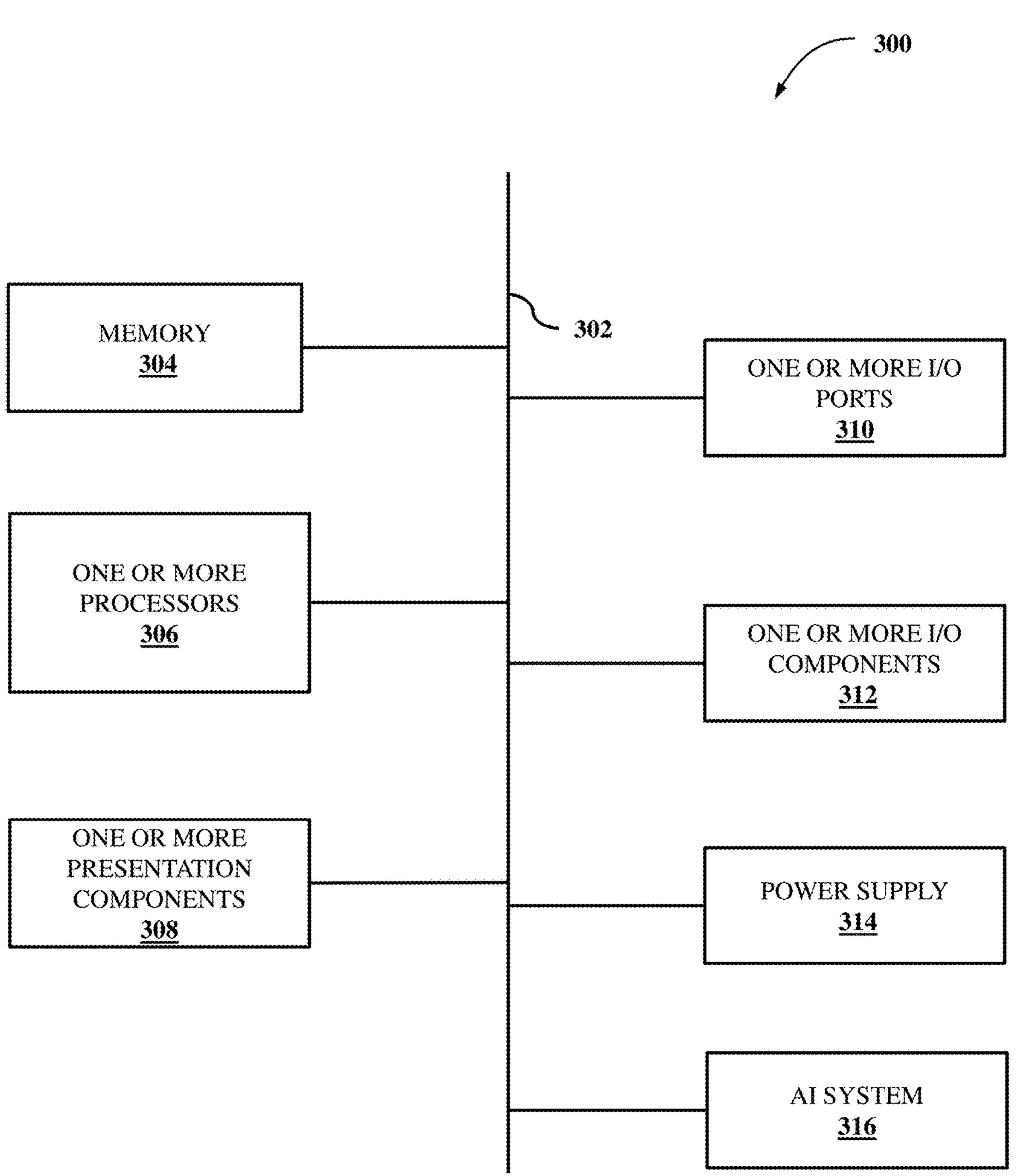
FIG. 3 is a diagram that illustrates functional attributes of the automated system for managing cyber security and regulatory risks, in accordance with an embodiment of the present invention.

FIG. 3 is a diagram that illustrates functional attributes of the automated system for managing cyber security and regulatory risks, in accordance with an embodiment of the present invention. As shown, FIG. 3 illustrates the block diagram of a computing device 300, in accordance with various embodiments of the present disclosure. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device".

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by the computing device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes one or more processors that read data from various entities such as memory 304 or I/O components 312. The one or more presentation components 308 present data indications to a subscriber or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device, etc.

The AI system 316 is an integral component of the computer system 300 within the present invention, playing a crucial role in managing and optimizing cyber security and regulatory compliance processes. The building phase of the AI system 316 involves integrating various data sources, both internal and external, into a cohesive framework. Internal documents, such as security policies, incident reports, and audit results, are enriched with contextual labels and segmented for granular analysis. External data, including compliance frameworks, security advisories, and threat intelligence feeds, is continuously fed into the system to ensure it remains updated with the latest information. In an embodiment, training the AI system 316 involves using this comprehensive dataset to enhance its language understanding and predictive capabilities. Historical data sets, such as past security questionnaires and audit outcomes, are employed to fine-tune the model. This process helps the AI system 316 learn specific terminologies, regulatory requirements, and typical security issues pertinent to the organization, improving its ability to generate accurate and contextually relevant insights. The learning phase of the AI system is ongoing and dynamic. As new data is integrated, whether through real-time threat intelligence feeds or updated internal documents, the system continuously updates its knowledge base. This iterative learning process enables the AI system to adapt to evolving threats and regulatory changes, ensuring its recommendations remain current and effective. In predicting, the AI system 316 utilizes its trained models to forecast potential security vulnerabilities, compliance gaps, and the necessary actions to mitigate these risks. For instance, when a new security advisory is received, the AI system can predict its relevance to the organization, assess the current security posture, and recommend specific steps to address any identified vulnerabilities. This predictive capability is crucial for proactive risk management. Further, optimizing involves refining the AI system's operations to enhance efficiency and accuracy. This includes optimizing data processing workflows, improving the accuracy of predictions through continuous model refinement, and ensuring that the system's recommendations are both actionable and contextually appropriate. For example, the AI system can optimize task prioritization in the workflow management tool, ensuring that the most critical security issues are addressed first.

The invention is an automated system for cyber security and regulatory risk management, comprising processors that perform multiple functions. These functions include retrieving and storing internal and external documents from various sources, such as drive platforms for internal documents and RSS feeds or uploads from trusted sources like NIST and CISA. The system enriches these documents with contextual labels indicating their relevance to specific products, business units, or the organization's security posture. It also segments documents for granular labeling and analysis. The system augments a language model with these enriched documents and fine-tunes it using historical data, such as past security questionnaires and audit results. Further, real-time threat intelligence and news feeds are integrated into the system, triggering real-time analysis to summarize, prioritize, and extract recommended actions from new advisories. The system conducts automated reviews of security advisories to assess their relevance and generate specific action items, performs gap analysis by comparing regulatory requirements with the organization's policies and controls, and generates detailed reports on vulnerabilities and incidents related to dependencies like SaaS platforms. Further, analysis results are integrated with workflow management solutions such as Jira or Microsoft Azure DevOps, generating work items for updating security policies and implementing security controls based on new threat vectors. This integration includes bidirectional feedback loops for continuous system improvement. The system provides an ad-hoc natural language interface, including a chatbot, for real-time user interaction, allowing users to query the system about compliance gaps or determine action items from news articles. The document retrieval process can periodically scan for new documents or use event triggers for updates. Documents are stored in centralized locations with enforced lifecycle policies and encrypted to ensure security. The system combines multiple sources of threat intelligence for a comprehensive threat landscape view. It supports both large and small language models for tailored augmentation and uses machine learning techniques to automate the labeling process based on predefined criteria. Real-time threat intelligence integration triggers immediate alerts and recommendations based on the severity and relevance of detected threats.

The present invention offers numerous advantages that significantly enhance the management of cyber security and regulatory compliance within an organization. One of the primary benefits is the automation of document retrieval and analysis processes. By automatically gathering and processing both internal and external documents, the system reduces the time and effort required from security and compliance teams. This automation ensures that the organization remains up to date with the latest regulatory requirements and security threats, thereby minimizing the risk of non-compliance and security breaches. The use of an AI system for contextual labeling and fine-tuning adds another layer of precision and relevance to the data processing capabilities. The AI system's ability to understand and interpret complex documents enables it to provide highly accurate and actionable insights. This means that the recommendations generated by the system are tailored to the specific needs and contexts of the organization, improving the effectiveness of the implemented security measures and compliance strategies. Real-time threat intelligence integration is another significant advantage, allowing the system to stay ahead of emerging threats. By continuously monitoring and analyzing new advisories and threat feeds, the system can prioritize and address the most critical security issues promptly. This proactive approach helps in mitigating risks before they can escalate into major incidents, thereby protecting the organization's assets and reputation. The system's workflow integration capabilities streamline the execution of recommended actions. By integrating with tools like Jira and Microsoft Azure DevOps, the system ensures that all identified tasks are tracked, managed, and completed efficiently. This integration facilitates seamless communication and coordination among different teams, enhancing overall productivity and accountability. Moreover, the natural language interface provides an intuitive and user-friendly way for non-technical stakeholders to interact with the system. This accessibility ensures that a broader range of users can understand and manage security and compliance issues without needing deep technical expertise. This democratization of access to critical security information fosters a more informed and proactive security culture within the organization. In terms of applications, the present invention can be utilized across various industries that require stringent cyber security and regulatory compliance measures. Financial institutions, healthcare providers, government agencies, and large enterprises can all benefit from the system's capabilities. For example, in healthcare, the system can help ensure compliance with regulations like HIPAA, while in finance, it can assist with adherence to PCI-DSS standards. Government agencies can use the system to manage compliance with national security regulations, and large enterprises can leverage it to maintain robust security postures across diverse and distributed IT environments.

The foregoing descriptions of specific embodiments of the present technology have been presented for purposes of illustration and description. They are not intended to be exhaustive or to limit the present technology to the precise forms disclosed, and obviously many modifications and variations are possible considering the above teaching. The embodiments were chosen and described to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. An automated system for cyber security and regulatory risk management, the automated system comprising:

one or more processors configured to perform operations comprising:

retrieving and storing internal and external documents from a variety of sources;

enriching the retrieved documents with contextual labels;

augmenting a language model with the enriched documents and fine-tuning the model using historical data;

wherein the augmented and fine-tuned language model is configured to process real-time threat intelligence and news feeds integrated into the system to generate context-aware outputs based on the retrieved and enriched documents, wherein integration of the real-time threat intelligence and news feeds is performed using an event-driven trigger mechanism that automatically initiates analysis upon detection of new or updated advisories without requiring a user query;

analyzing, using the augmented and fine-tuned language model, security advisories and regulatory requirements in combination with the retrieved internal and external documents to generate actionable insights and recommendations, wherein the analyzing comprises determining applicability of each security advisory or regulatory requirement to an organization by mapping the security advisory or regulatory requirement to organization-specific internal documents including policies, infrastructure descriptions, and dependency information, and performing automated gap analysis by comparing the regulatory requirements with implemented security controls and policies represented in the internal documents to identify compliance gaps;

prioritizing the generated actionable insights and recommendations based on relevance to the organization, severity of associated threats, and impact on organization-specific infrastructure and compliance requirements;

automatically converting the actionable insights and recommendations into executable work items and integrating the analysis results with workflow management solutions to generate and track work items; and providing an ad-hoc natural language interface for user queries and real-time interaction with the system, wherein the natural language interface is configured to query the augmented and fine-tuned language model and the stored documents to provide responses based on the generated actionable insights, tracked work items, and integrated threat intelligence.

2. The system of claim 1, wherein the documents retrieval and storage include connectors for drive platforms for the internal documents, wherein the connectors are used to interface with the drive platforms, enabling to retrieve the internal documents.

3. The system of claim 2, wherein the documents retrieval and storage further include retrieval of the external documents from one or more regulatory bodies.

4. The system of claim 1, wherein the documents storage comprises centralized storage locations, with enforced lifecycle policies based on a document type of the retrieved documents.

5. The system of claim 1, wherein the documents enrichment comprises labeling the documents to indicate relevance to specific products, business units, or whether they describe a current state or desired state of an organization's security posture.

6. The system of claim 1, wherein the augmentation of the language model comprises fine-tuning the model using historical data sets, including past security questionnaires and audit results.

7. The system of claim 1, wherein the integration of the real-time threat intelligence and news feeds triggers real-time analysis, including summarization, classification, prioritization, and extraction of recommended action items from new advisories.

8. The system of claim 7, wherein the analysis includes automated review of security advisories to assess relevance and generate the action items specific to an organization.

9. The system of claim 8, wherein the analysis performs gap analysis by comparing regulatory requirements with the organization's policies and security controls to identify discrepancies and suggest improvements, and wherein the analysis further includes a reporting feature that generates detailed reports on vulnerabilities and incidents related to the organization's dependencies.

10. The system of claim 1, wherein the integration with workflow management solutions includes generating work items for updating security policies and implementing security controls based on new threat vectors.

11. The system of claim 10, wherein the integration with workflow management solutions further comprises bidirectional integration, allowing feedback loops for continuous improvement of the system.

12. The system of claim 1, wherein the one or more processors are further configured to provide an ad-hoc natural language interface that includes a chatbot for real-time interaction and queries from users.

13. The system of claim 12, wherein the ad-hoc natural language interface further allows users to ask questions about compliance gaps based on new frameworks or determine action items from news articles.

14. The system of claim 1, wherein the one or more processors are further configured to retrieve the documents by periodically scanning for new documents or using event triggers to detect new document uploads and update the model.

15. The system of claim 1, wherein the one or more processors are further configured to enrich the documents by segmenting documents into smaller parts for more granular labeling and analysis.

16. The system of claim 1, wherein the one or more processors are further configured to integrate threat intelligence by combining multiple sources of threat intelligence to provide a comprehensive view of a threat landscape.

17. The system of claim 1, wherein the one or more processors are further configured to store the documents by implementing encryption to ensure security of the stored documents.

18. The system of claim 1, wherein the language model augmentation supports both large language models (LLMs) and small language models (SLMs) for tailored augmentation.

19. The system of claim 1, wherein the one or more processors are further configured to enrich the documents by using machine learning techniques to automate the labeling process based on predefined criteria.

20. The system of claim 1, wherein the real-time threat intelligence integration triggers alerts and recommendations for immediate action based on severity and relevance of threats.

* * * * *